US010345450B2

(12) United States Patent
Calhoun

(10) Patent No.: US 10,345,450 B2
(45) Date of Patent: Jul. 9, 2019

(54) SYSTEM AND METHOD FOR RADIO AND WIRELESS MEASUREMENTS TRACKING AND REPORTING

(71) Applicant: Kimberly H. Calhoun, Raleigh, NC (US)

(72) Inventor: Kimberly H. Calhoun, Raleigh, NC (US)

( * ) Notice: Subject to any disclaimer, the term of this patent is extended or adjusted under 35 U.S.C. 154(b) by 0 days.

(21) Appl. No.: 14/583,744

(22) Filed: Dec. 28, 2014

(65) Prior Publication Data

US 2016/0031416 A1 Feb. 4, 2016

Related U.S. Application Data

(60) Provisional application No. 61/921,904, filed on Dec. 30, 2013.

(51) Int. Cl.
*B60R 25/102* (2013.01)
*G01S 19/16* (2010.01)
*H04W 4/02* (2018.01)
*H04W 4/90* (2018.01)

(52) U.S. Cl.
CPC ............ *G01S 19/16* (2013.01); *H04W 4/023* (2013.01); *H04W 4/90* (2018.02)

(58) Field of Classification Search
CPC ....... B60R 25/102; H04W 4/023; G01S 19/16
USPC ................................ 701/300, 482, 483, 517
See application file for complete search history.

(56) References Cited

U.S. PATENT DOCUMENTS

| | | | | |
|---|---|---|---|---|
| RE44,085 E | * | 3/2013 | Taylor, Jr. | 340/539.1 |
| 8,773,275 B1 | * | 7/2014 | Parenteau | G01S 19/16 340/539.13 |
| 8,983,435 B2 | * | 3/2015 | Weiss | H04W 12/08 455/411 |
| 2008/0231462 A1 | * | 9/2008 | Hobart | G08B 21/22 340/686.6 |
| 2012/0268269 A1 | * | 10/2012 | Doyle | G08B 21/0202 340/539.13 |

* cited by examiner

*Primary Examiner* — Anshul Sood

(57) ABSTRACT

A monitoring system that utilizes Geo-mapping tools collaborating with a network and tracking devices to establish geo-fencing and predictive policing technology which can be used to do simple monitoring tasks, necessary interventions, or archive details as evidence for reports. The tracking devices are capable of communicating to the network via wireless signals provided by various carriers or independently. The Network is programmed with thresholds which are assigned to tracking devices and communicates to the Network via wireless transmission signals. The tracking devices are continuously monitored by the network and provide real-time alerts and detailed time-stamped reports when the thresholds are met. The tracking devices are equipped with many sensors which aid with monitoring the established thresholds and the ability to communicate between each other independent of the network. A mobile virtual private network provides the ability to communicate with tracking devices without the need of a carrier network.

20 Claims, 6 Drawing Sheets

SYSTEM AND METHOD FOR RADIO AND WIRELESS MEASUREMENTS TRACKING AND REPORTING

CLAIM TO PRIORITY

This Non-Provisional application claims under 35 U.S.C. § 120, the benefit of the Provisional Application 61/921,904, filed Dec. 30, 2013, Titled "System and Method for Radio and Wireless Measurements, Tracking and Reporting" which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The invention disclosed in this document relates generally to tracking systems to enforce compliance with court ordered restrictions on the location and movement of individuals. Court issued restraining orders exist to permit a first individual who is being harassed by a second individual to place limits on the second individual's proximity to the first individual's location. While the order is in force, the second individual risks incarceration if they are caught violating the provisions of the restraining or protective order. At issue is the means whereby the second individual may be monitored and apprehended if the second individual is in violation of the restrictions placed on them with respect to the first individual's location. Often, the provisions of a court order are violated without the violation coming to the attention of law enforcement until after the violation has occurred.

Tracking methods have improved to the point where a tracking device may be attached to a second individual and permit law enforcement to know the location of any individual so tagged. However, law enforcement organizations do not have the manpower to constantly monitor tracking devices on the chance that an individual might violate the conditions of a protective or restraining order. This deficiency can be overcome through the use of automated monitoring, where a computer with appropriate tracking software and alerts to the law enforcement organization when violations occur. A law enforcement organization may then take action to enforce the existing order.

DETAILED DESCRIPTION OF THE INVENTION

Figure 1:
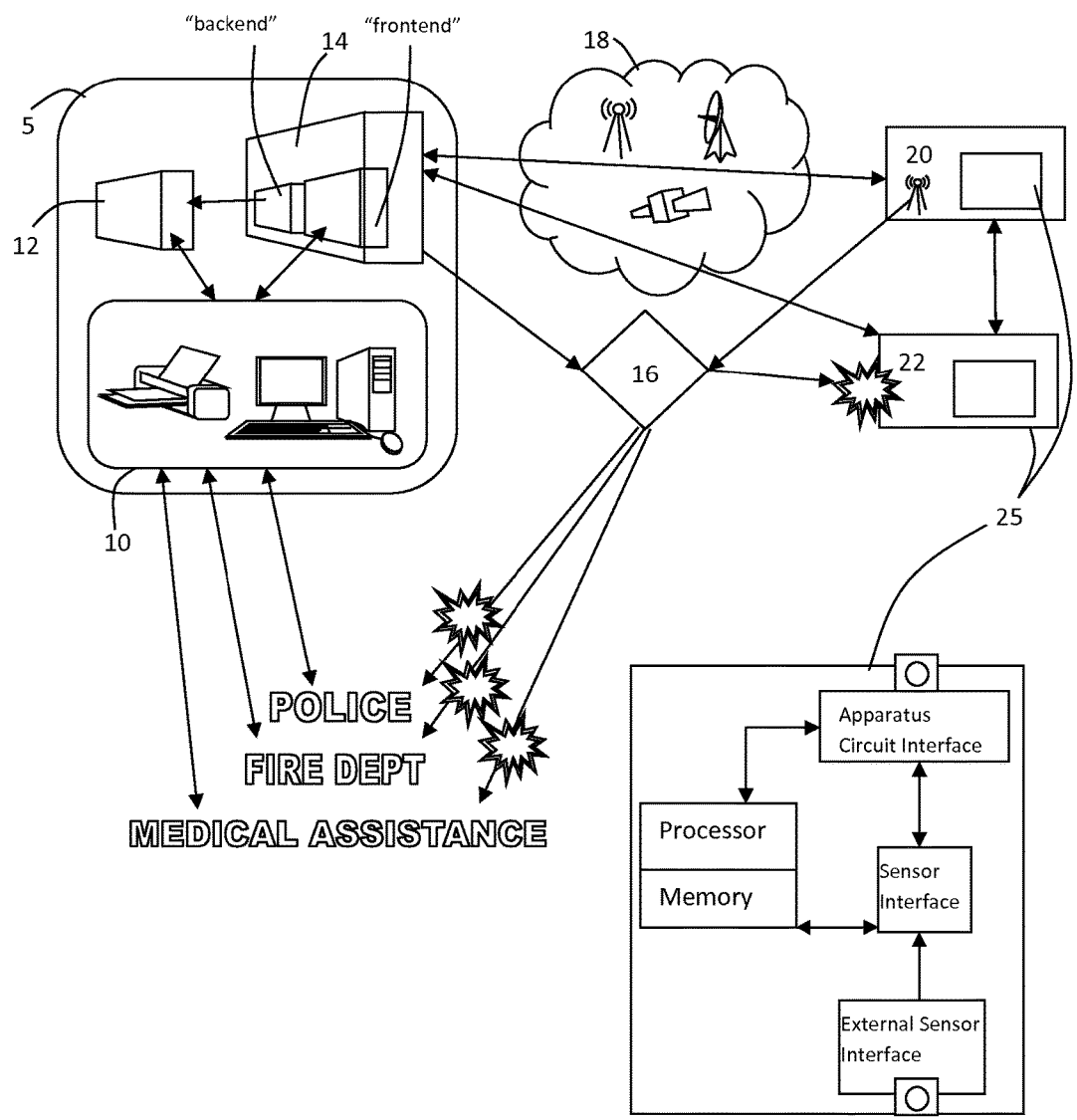
FIG. 1—A diagram of the Network, monitoring system and tracking devices consistent with the certain embodiments of the present invention.

The invention relates to a method of performing measurements of distances of radio and any type of wireless signal transmitting technology which establishes thresholds and generates notices and real-time alerts when thresholds are met.

A tracking system for monitoring an entity using one or more primary tracking apparatuses is carried by a first entity. The primary tracking apparatus including one or more sensors and one or more secondary tracking apparatuses are carried by a second entity. The secondary tracking apparatus including one or more sensors, where each tracking apparatus includes a monitoring and reporting device, a storage device, and access to a network. Each tracking apparatus may have one or more signal transmitting technologies to communicate with the network through a wireless communications network, the tracking apparatuses having a local communications network to communicate with each other. Each monitoring and reporting device used for monitoring in real-time has one or more variables collected from the tracking apparatuses through the network. The monitoring and reporting devices are further used for sending one or more reports regarding the variables collected to one or more authorities through the network. Each monitoring and reporting device is further capable of saving the reports to the storage device. The system may also have one or more alert systems installed on at least one of the tracking apparatuses.

The local communications network of this tracking system transmits information over an associated radio frequency. The radio frequency is used for measuring a distance between the primary and secondary tracking apparatuses and the alert system signals an alert when the distance between the primary and secondary tracking apparatuses are within a predetermined distance from each other.

The alert system of this tracking system transmits an alert to at least one of the tracking apparatuses. The alert system signals an alert to the tracking system through the wireless communications network. At least one of the tracking apparatuses is carried by being embedded within the entities. The tracking system's secondary tracking apparatus is placed at a location.

One or more sensors of the tracking system can detect the variables selected from one or more of the following group: moisture types, moisture levels, body temperature, environment temperature, heart rate, audio, water levels, motion detection, blood type of carrier, light levels and vitals. The sensors programming contain the entity who is wearing the apparatuses medical records and vital records used to pre-establish one or more thresholds, and the alert system sending an alert to the network when the sensor detects that the one or more variables are not within the one or more pre-established thresholds. The network of this tracking system transmits a real-time alert to one or more authorities after receiving the alert and can simultaneously transmits a real-time alert to one or more secondary tracking apparatuses.

The signal transmitting technology of the tracking system is selected from the group comprising: cellular, GPS, CDMA, LTE, Wi-Fi, Bluetooth, radio, RFID satellite and signals derived from technology being evolved and not yet on the market. The tracking apparatuses of this tracking system communicate through the local communications network using Bluetooth, radio or RFID and technologies being evolved and not yet on the market. The real-time alert system emits an electronic shock to the entity carrying one of the primary tracking apparatuses when the primary and secondary tracking apparatuses are within a pre-determined distance from each other. Electronic shock may also be triggered on the primary apparatuses by an authority with remote access transmitting a signal through the network.

The alert system of the tracking system is triggered when the entity carrying the primary tracking apparatus is no longer attached to or carries the primary tracking apparatus. The tracking system also triggers the alert system when the primary apparatus loses communication with the monitoring network system. The tracking systems variable includes pre-defined geographical locations and/or is the entities' physical location. The monitoring and reporting device further includes a geographical mapping tool for real-time location monitoring and reporting of the tracking apparatuses.

The tracking system includes a mobile network that monitors one or more variables collected from the primary and secondary tracking apparatuses; the mobile network sends the variables collected to the network. The mobile network of the tracking system is capable of independently and privately monitoring the primary and secondary tracking apparatuses. The transceiver node of the mobile network is the size of a credit card or smaller.

The tracking system where the first entity is an asset and the second entity is the owner of the asset. The first entity includes one or more sensors. The second can track and monitor the first entity and the second entity receives alerts based on predetermined thresholds being established. The second entity can track and monitor the first entity and visually see the first entity's physical locations and can record and store the data.

The tracking network provides a method for tracking an entity named in a court order comprising the steps by placing a primary tracking apparatus on the entity, which is identified as an offender and if necessary by placing a secondary tracking apparatus on a victim. The locations of the primary and secondary tracking apparatuses are continuously monitored using a tracking system network. The tracking system constantly measures the distance between the primary and secondary tracking apparatuses using a local communications network between the primary and secondary tracking apparatuses. A real-time alert is transmitted when the locations of the tracking apparatuses are within a defined distance, and/or when the distance between the tracking apparatuses are within a defined distance, and/or when one of the tracking apparatuses indicates that it has been tampered with. The alert is generated from at least one of the tracking apparatuses and sent to the network. The alert is generated from the network and is sent to the other tracking apparatus. By combining predetermined thresholds that are programmed in the network with the real-time data collected from the apparatuses the Network is capable of providing various levels of alerts.

This tracking system uses a method for tracking where the tracking apparatus indicates that it has been tampered with by measuring one or more vital signs of the entity wearing the tracking apparatus and comparing the measured vital signs with one or more pre-defined thresholds and it will send a signal indicating that one or more of the measured vital signs is outside of the pre-defined thresholds.

This tracking system uses a method where the tracking apparatus indicates that it has been tampered with by measuring one or more environmental conditions of the tracking apparatus, and compare the measured environmental conditions with one or more pre-defined thresholds and it will sending a signal indicating that one or more of the measured environmental conditions is outside of the pre-defined thresholds. The method where the tracking apparatus indicates that it has been tampered with by using the sensors and elements in the apparatus recognizing the apparatus has been altered, opened or removed from communications of any of the signals.

Figure 2:
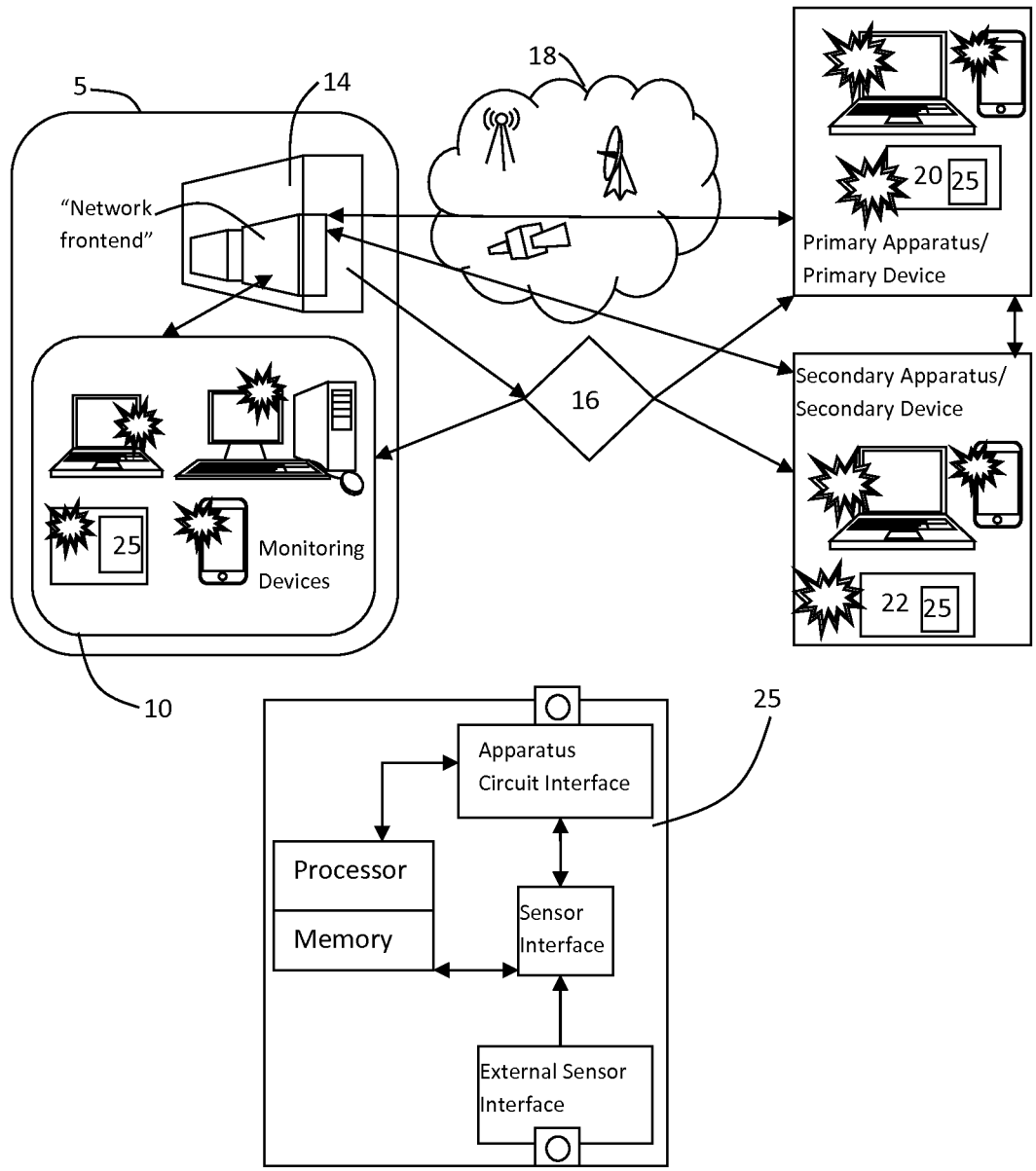
FIG. 2—A diagram of the Network, monitoring system, tracking devices with sensor consistent with the certain embodiments of the present invention.

Referring to FIGS. 1 and 2, an illustrative non-limiting embodiment of the present invention is shown as a monitoring and tracking system 5 and one or more remote devices 20 22. The Tracking system 5 includes a Monitoring and Reporting device 10, storage 12, network 14 and alert mechanism 16 that works within the Tracking system 5 and also externally on the remote devices 20 22.

As further shown, the monitoring and tracking System 5 of the invention communicates via a wireless device or system 18, to the tracking apparatuses 20 and 22. The tracking apparatuses 20 22 are designed to have a combination of different types of wireless technology that can be tracked by various wireless signals and a radio signal which is used for localized detection. The Mobile Network 24 (FIG. 3) stands alone and provides the same functions as the Network 14 but provides a private tracking network that is portable. Private Tracking Network is similar to a Private Virtual Network but mobile. It is standalone and does not need access to the cloud or any carrier or resource to function and it can operate off of batteries. Sensory circuits 25 are embedded within the tracking apparatuses 20, 22 to provide data informing the Network 14 if the tracking apparatuses are broken or detached from an entity, it is also used to provide statistical medical data and environmental data.

The tracking system 5, and particularly the network 24, is preferably implemented as a computer or other processing device. The computers have a memory (such as storage 12), processing capacity, a display device and an input device such as a keyboard, touchscreen or mouse. Unless otherwise stated, the steps performed herein are all performed automatically in real-time by the processor, without manual interaction after it is programmed.

One significant use of the tracking apparatuses 20 and 22 when combined with the Network 14 is to deter violators of protective and restraining orders, or offenders of other type of court orders. It is particularly useful for law enforcement purposes to enhance predictive policing abilities to provide real-time statistics and alerts for more efficient intervention of crimes. For example referring to the flow chart in FIG. 4 if there is a protective order issued by the court or when a court order is issued, step 50, the data is entered into the Network 14, step 52. The tracking apparatus 20 is identified as the Primary, step 54, and is attached to the offender and another tracking apparatus 22 is identified as the Secondary, step 56, which is attached to the victim. At step 58, data sent by the tracking apparatuses 20, 22 are collected by the Network and used as evidence to enforce protective orders. If the details of the order are violated or the apparatuses are tampered with, step 60, an alert with details is sent to the secondary device (step 62) so they can seek safety, to the authorities (step 64) so that they can intervene and a report is generated (step 66) to be used as evidence in court. The reports are stored and backed up, step 68.

Figure 4:
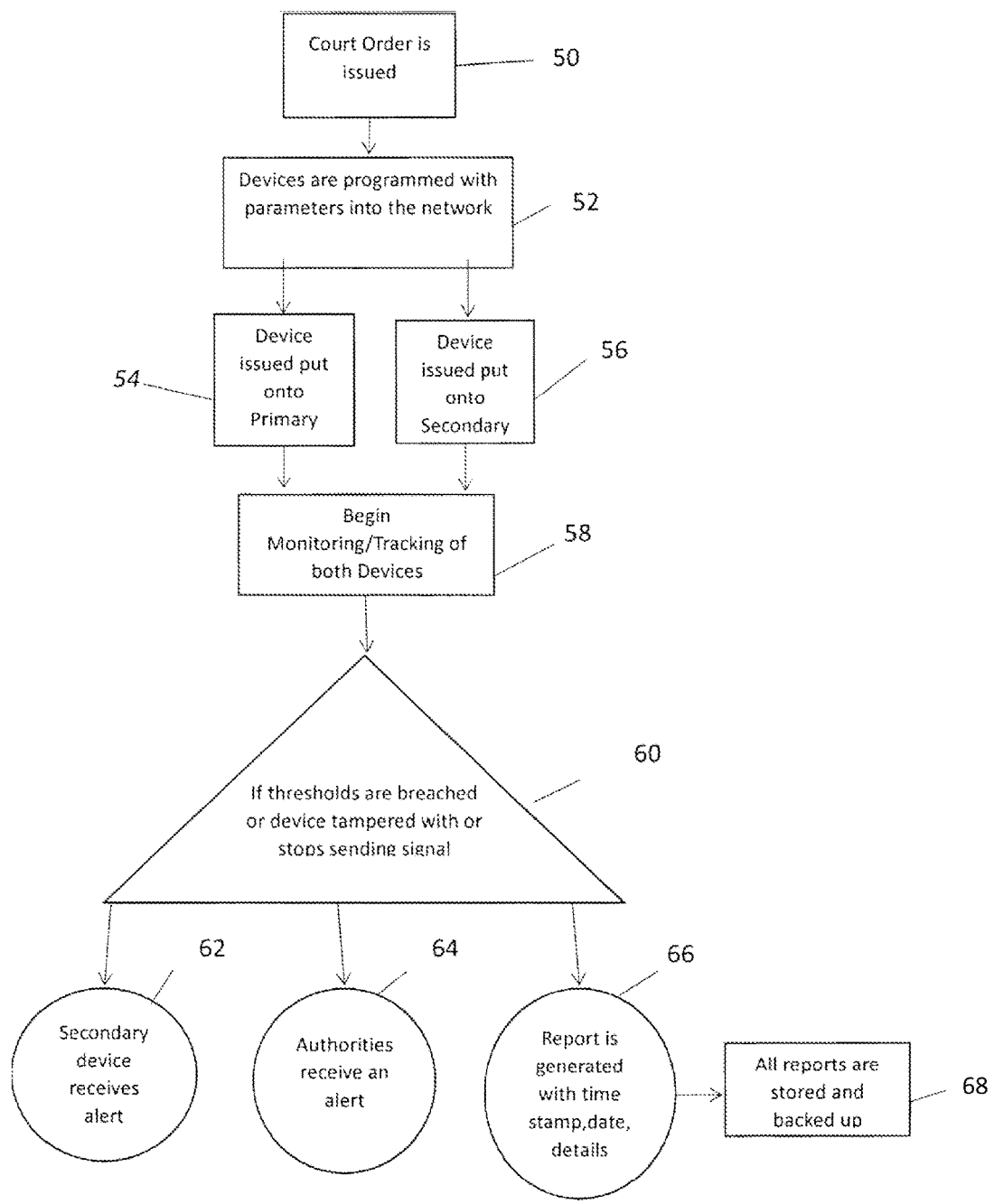
FIG. 4—flow chart of Predictive Policing steps to enforce protective orders consistent with the certain embodiments of the present invention.

FIG. 4 is a flow chart demonstrating the necessary process to establish the thresholds and monitor and collect the necessary data for the network to perform the predictive policing tool and react in real-time to generate in the necessary alerts and reports for intervention when a court order (restraining order) is being violated.

Though one implementation of the invention is for protective orders, with a network constantly monitoring tracking devices collecting necessary data to provide to the predictive policing analysis of the network for the purposes of monitoring, sending real-time alerts and generating detailed time stamped reports it can also be used and programmed to enforce many other court orders including pedophiles, parolees, and repeat offenders. It can also be used to monitor tagged assets and monitor mass groups identifying associations in the group which ideally can be used for assisting authorities with the human trafficking issues or search and rescue missions. The sensors aid with the predictive policing analysis performed by the network technology enabling the tracking devices to operate independently from the network and communicate between each other or with the Mobile Virtual Private Network independent and off the grid.

Referring to FIG. 1, when a protective order is issued the details of the order are programmed into the Network computer 14. Primary Tracking apparatuses 20 are locked on to the offender and Secondary tracking apparatuses 22 are provided to or locked to the victim/s. The devices 20, 22 are turned on and activated to communicate with the Network 14 via the Wireless signals over the wireless communications network 16. The Tracking Apparatuses 20 22 are programmed to be associated with each other's radio frequency with a distance established so that the secondary tracking apparatuses 22 can detect when the Primary tracking apparatuses 20 is close. For example, if the protective order established a distance between the entities to be 1,000 feet; if the tracking apparatuses 20, 22 ever get too close or within the 1,000 ft. of each other, details of the distance are updated to the Secondary Tracking apparatuses 22 so that they can try to seek safety and protect themselves. The Primary Tracking apparatuses 20 will sound off a loud audio alarm if it is too close and emit an electronic shock, similar to a Taser gun, to temporarily disable the entity wearing the Primary tracking device 20 will be activated if necessary.

Once the tracking apparatuses 20 22 are activated the Network monitors them 24 hours a day, 7 days a week. All details including date time and location of where they are will be recorded and stored in our storage devices 12 to be used if necessary. The network 14 constantly monitors the tracking apparatuses 20, 22 and the thresholds that were established and programmed. The network 14 processing device performs all the monitoring and calculations to determine if the thresholds of the variables are being breached. If the thresholds are ever met, the Network 14 is programmed to send out alerts 16 to the secondary 22 so they are aware of where the primary is, and to all the authorities that are authorized to access the system. At the same time details of the thresholds being breached are sent to the Monitoring and Recording 10 to print out a report to be used as evidence to enforce the order.

If the tracking apparatuses 20, 22 are ever tampered with or removed, the Network 14 detects this and alerts are sent out to the authorities and to the Monitoring and Recording module 10 and can be used as evidence. The tracking apparatuses 20 are designed with a loud audible alarm that sounds off if it is removed improperly or if it breaches the thresholds programmed into the network 14.

The Tracking apparatuses 20 22 have a sensor 25 that is attached to them. The sensor 25 is used to further identify the person, animal or thing it is attached to and ensure the tracking apparatuses 20, 22 stay attached to the entities. It can detect temperature, moisture, vital signs. It can store information to be monitored such as the entities identity and medical information which can be accessed by medical personnel or authorized entities in emergency situations. These things can aid in helping people with many medical issues and to further ID the person wearing the device. The sensor 25 monitors body temperature and moisture to ensure the tracking apparatuses 20 22 are still attached to the entity it was locked on to. That information is regularly sent to the network computer 14. If any of these things should change drastically the Network 14 detects this and sends out alerts with details to the proper authorities. The sensor 25 also monitors and collects vital statistics data of the entity it is attached to and sends a report of that data to Network 14. This invention is intelligent enough to recognize environmental changes such as if it is submerged in water and to determine changes of body temperature changes or moisture or heart beat detecting if it is detached from the entity. Its other functions are to assist with medical situations such as monitoring vital statistics and sending reports to the Network 14 for medical purposes.

Network: 14

Referring to FIG. 1, the Network computer 14 monitors whatever variables are programmed in it. The backend is the back layer of the computer system where the software code is that generates the calculations of all the variables that are programmed into the Network 14. Variables for the Network come from unlimited sources. Variables are either collected by a device and automatically up loaded into the Network 14 or programmed into the Network 14. The variables include IP address that we assign associating the tracking apparatuses 20 22, locations, addresses, time, and a delta of distance that apparatuses must abide by. The algorithm in the backend is designed to monitor these variables in real-time.

The Network 14 collects data from the tracking apparatuses 20 22 via the wireless network signals 18. This data is used to compare the thresholds programmed into the backend of Network 14. It also collects data from audio and video equipment from satellite geographical updates that are programmed to send information to the Network 14 and. Other variables unique to a person, such as their blood type, DNA, physical features such as face recognition, finger printing and other means of identifying an entity if available are programmed into the Network 14 for monitoring.

The front end is where the user friendly software is downloaded to operate the Network 14. It is accessed via computers or other electronic devices that can link up to the network. It hosts the geographical mapping tool that is used to visually watch the tracking apparatuses 20 22 and it is where the details of the orders are entered in to the Network 14. The geographical mapping tool provides a visual of the tracking apparatuses 20, 22 at all times. Any well-known suitable geographical mapping tool can be utilized. Thus, the backend is where the invention software is located and operating. The frontend can also incorporate software of the invention as well as incorporate any other software for user friendly access.

The Network 14 is designed so that it can be programmed to send reports, notices and alerts with various details to entities that are designated to receive them. Entities such as legal authorities, medical professionals, schools, hospitals will receive alerts and reports detailing the alerts. Real-time visual geographical tracking results of the apparatuses are available to authorized entities. The Network is programmed to communicate with our apparatuses, but can communicate with other devices.

Tracking Apparatuses 20, 22

Referring to all figures, the tracking apparatuses 20, 22 are programmed and assigned with individual unique identities. These identities are recognized by the tracking Network 14. The Tracking Apparatuses are programmed as a Primary 20 and as Secondary 22. The Network 14 is programmed to associate the identification between the Primary 20 and Secondary 22 tracking apparatuses, such as in a lookup table or the like. There is generally only one Primary apparatus 20 associated with one or more (indefinite amount) Secondary apparatuses 22. However, more than one Primary 20 tracking apparatuses can be associated with each Secondary tracking apparatuses 22.

The primary and secondary apparatuses are similar utilizing the same wireless transmitting signals but they are designed different where the secondary 22 has alarms that will activate when it receive alerts that the primary 20 breached any thresholds that are established. The Primary 20 is designed where its original circuitry can emit electronic signals like Taser gun.

The backend of the Network 14 detects and records if any of the programmed thresholds are breached. Details such as the timestamp, name of people involved, case number, and the geographical locations of the apparatuses are sent to whoever is programmed to receive them. The real-time visual of the apparatuses 20 22 can be viewed on a map with available electronic devises by entering authorized user codes. This monitoring will be as close to real-time monitoring as current technology offers.

Multiple (preferably 3-4) types of wireless signals are used in the invention as backup in case a signal drops. Those signals can include GPS, CDMA, GSM, satellite, WIFI, Radio, and RFID. Geographical tracking is done by utilizing any well-known mapping tool such as google maps or a satellite tool. The mapping tool is integrated with the software in the backend of Network 14. This calculates the delta between apparatuses and any thresholds that are programmed into the backend of the network 14. If these thresholds are ever met or breached the algorithm establishes flags on what has been breached and send alerts. For example: There is an order defining that two people are supposed to stay more than 1000 feet apart from each other and legal authorities and one of them should get an alert if the other gets to close providing details of the breach. They will be ordered to wear the tracking apparatuses 20, 22. The network 14 monitors these thresholds and if that person is recognized by the network 14 as going in the same direction as they are supposed to stay away from it will be flagged in the software code to be monitored more closely and if it reaches the boundaries that have been established then the network will send out alerts to whomever are programmed to receive details of this breach. The algorithm can perform all kinds of calculations for all types of variables. It is not just limited to what we just demonstrated here. The backend and frontend are tied together via any well-known APL.

The tracking apparatuses 20, 22 are designed to be tamper proof and water resistant. They are designed to be worn by humans, animals or attached to items or even be set up to establish locations such as a house. The apparatuses are made of a material that cannot be easily destroyed. Their locking mechanism is designed so that it cannot be invaded or disconnected without a person of authority's assistance. The apparatuses generate a signal that sends out an alert to authorities if it is removed or if it is tampered with or destroyed in any manner. It is also designed to generate an electrical signal similar to Taser gun that can be used to temporarily impair and disable the entity wearing the device if approved by legal authorities.

The tracking apparatuses 20, 22 detects when it has been tampered with by constantly sending a signal to the Network 14 to be monitored. The Network routinely monitors and validates the apparatuses using the software in the backend of Network 14. This communication occurs by using the wireless signals 18. For example the Network 14 is programmed to monitor them every 10 seconds; if it misses more than two 10 second signals then it is flagged to be checked every 3 seconds. If nothing is detected it confirms the last known location and send out alerts with details to the secondary tracking apparatuses so they can seek safety and to the authorities so they can track down the Primary tracking apparatus 20.

Apparatuses 20, 22 are small microscopic size Microchip designed to be easily disguised when locked onto the entities to be non-evasive or can be inserted into entities. Power sources utilized for the Tracking apparatuses 20, 22 are any well-known and suitable source. We can utilize any type of power source such as Rechargeable batteries, solar batteries, power sources that work off of motion. Sources can be combined if necessary to improve longevity and reliability.

Wireless Technology 18

Referring to FIGS. 1 and 2, each tracking apparatus 20, 22 are layered with different tiers of signal transmitting technology so if one tier fails to be able to communicate to the Network another tier will pick up. The signals use any well-known and suitable existing technology and is not limited to cellular, WIFI, radio and satellite. The radio signal or RFID is used for local tracking, when wireless technology is not available. The Tracking apparatus 20, 22 shall be able to incorporate any type of technology existing for transmitting signals. The flexibility of this engineering allows us to operate more globally in environments with different types of signally technology and upgrade as technology changes.

The Radio signal utilizes existing technology providing a tracking ability in remote locations lacking in wireless technology.

Monitoring and Reporting 10

Referring to FIG. 1 the monitoring and reporting mechanism operates in the frontend of the Network 14. The data transmitted is delivered to a tool that provides a more detailed and user friendly geographical mapping device clearly identifying the location and movements of each tracking apparatus 20 22. The Primary use and purpose of this is to establish a means to track and document the Primary apparatuses 20 geographical location and determine when it reaches the programmed threshold of distance with the Secondary apparatuses 22. The Network 14 generates a time stamp of this occurrence and send alerts providing valuable information indicating how close the apparatus are and at what rate they are traveling. These details can be used by the authorities and by the victim to intervene if necessary.

Should any of the associated tracking apparatuses 20, 22 reach the established range or distance or breach any other variable programmed between them a real-time detailed report is generated, which can be used as evidence. The reports provide all the details necessary to enforce the order including case numbers, identity, time stamps and details of the violation and victim's name.

Sensing Circuits: 25

Referring to all Figures for apparatuses 20, 22, the sensors are a computerized chip with a processor and memory that is designed to detect body characteristics and local environment. They are microscopic in size and can easily be embedded wherever they need to be. The sensors 25 are connected to the circuitry of the apparatuses 20, 22. They detect the vital statistics and environmental statics such as moisture types and levels, temperature, heart rate, audio, water levels, motion, blood type, light. These sensors are programmed with the entities current medical records and vital records to pre-establish certain variables for thresholds. These thresholds are programmed into the sensors 25 and when they are breached an alert is sent to the Network 14 which then sends alerts to the proper authorities. Having programmed thresholds on the sensor eliminates the need for the network to constantly have to communicate with the devices. Data that the sensors are to monitor is stored in the memory of the sensory chip. Data such as normal heart rate and temperature patterns, blood type and sugar levels are programmed into the memory. The processor continuously collects data from the sensors which checks for the thresholds that are established in the memory for example a temperature or heart rate. The external sensors are made of material that touches the entity it is to monitor and has the ability to collect vital signs. If any of these thresholds drastically changes a red flag is established and the processor will communicate to the apparatus which will then communicate to the Network that something is not right and an alarm will be issued to the proper authorities.

As shown, the sensor 25 can have a processor, memory, interface, sensor interface, and external sensor interface.

The data can also be used to provide details that can be used for medical tracking purposes for diagnosis and treatment alerts. Real-time Statistics of the vitals are monitored and recorded providing a resource of information that can be used to provide medical assistance if necessary. The data is also used to apply an ID associated for the apparatuses.

Aside from the intended purpose to detect when a tracking apparatus 20, 22 has been breached these can be used for elderly homes and hospital care, child care, disabled people or people with critical medical conditions.

Storage 12

Electronic storage is important to this invention so as to keep and maintain records for future purposes. Any well-known and suitable technology providing storage can be utilized. One key element is the security of the storage. Utilizing existing technology we can develop a secure access to the Network that only authorized entities will have access to.

Mobile Network 24

Figure 3:
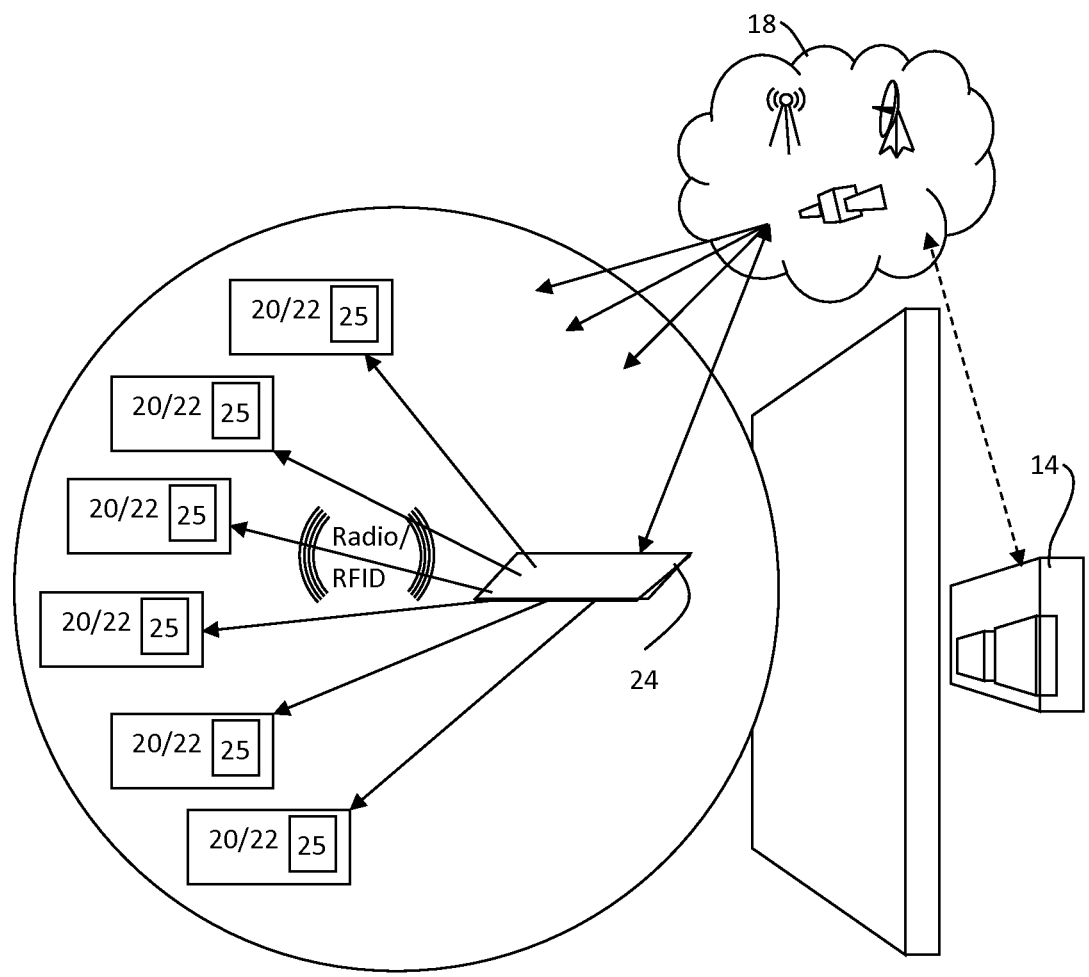
FIG. 3—A diagram of the Virtual Private Mobile Network consistent with the certain embodiments of the present invention.

Referring to FIG. 3 a Mobile Network device 24 utilizes the same software code as in our Network 14 in FIGS. 1 and 2 providing a standalone remote Network. It is the size of a credit card and monitors about 10,000 tracking apparatuses. It allows the tracking apparatuses 20, 22 to be tracked simultaneously with Network 14 or without. It operates independently and provides a means to monitor more local secluded situations similar to a Virtual Private Network. It can also be used as an emergency Network for emergency situations to aid with rescue missions or during evacuations or emergency situations. It operates off of any type of signaling type device for communicating with the devices it monitors. Its main purpose is to provide tracking solutions to remote locations or if there is limited signals in the area. It can run off of AC or DC power. Authorities tracking entities that violated the order can use this when they are in pursuit. It can also be used for private Network monitoring of a controlled and/or contained environment.

The network device 24 can use the same code as Network 14 it can either be used linked up to Network 14 or independently if you want to have your own Private Network zone to monitor, it operates similar to a Private Virtual Network. It is designed to be used as a mobile network with the capabilities to monitor as many as but not limited to 10,000 devices per card. Each card is currently but not limited to the size of a credit card. You can daisy chain as many network cards as you need for the mobile unit. It does not have to communicate to the cloud or through the network 14 it can operate completely independent and off the grid. It has its own wireless network or it can be connected to any available network. It can have its own wireless connection to communicate directly to the tracking apparatuses 20, 22. Its primary use is to either set up a private tracking environment for a business such as monitoring people and entities in a field study or it can be used as the portable unit that the police would carry to track down violators. Unlike the network 14, the mobile unit 24 does not need to have a reporting system. It can set up its own private tracking network that only it can see using its own radio or wireless signals to communicate with apparatuses. It can also interface with the network 14. The unit 24 can be daisy chained to increase bandwidth. The credit card size networks are placed inside a durable case. Any type of wireless signals can be installed to track the apparatuses. Utilizing any existing wireless technology you can build out a Private Network to track and monitor a defined area.

The Mobile virtual private network is like having a private buffer to monitor any entity with. For example it can be used to monitor a field study of 3000 animals and plants and 20 scientists in a 1 mile radius and you don't want anyone to be able to hack into it or use it from any other source. The tracking devices can be put where you want them, set up the Mobile network with the thresholds you want to monitor and it is tracking just those things. It can detect things that belong and determine if something does not belong in the environment. Another example is a lab environment to monitor all entities that come into the lab area.

Thus, unit 24 is a mobile unit that can stand alone. It has remote capabilities and runs off of DC and/or AC. It is like having your own private bubble to monitor. A private virtual tracking Network. You can put in your own private wireless signals to match up to the apparatuses you are tracking, it is designed so that no one else can see what you are doing. It can also be used for remote tracking for areas that are low on cellular type signals. It is also for the police to use while mobile, so they can quickly lock in on the signals of the apparatuses that are on the run.

Tracking any Type of Device for Meetings or Events

Referring to FIG. 2, an illustrative non-limiting embodiment of the present invention is shown as a monitoring and tracking system 5 and any programmable location with longitude and latitude, electronic device that has an IP that can be established for tracking purposes. Utilizing the same proprietary software that is in the frontend of Network 14 any type of electronic device and location can be monitored. Users, via their electronic devices, can login to the Network, program details of an event such as date, time location and other entities they wish to invite. Once the event is programmed into the Network all entities that were invited have an option to login in and accept. Once the entities accept, their devices are activated to be monitored by the Network 14. The entities have the choice to log out at any time disconnecting the tracking. All entities that have accepted the invitation can have access to a geographical map monitoring all the other devices that logged in for the event. The details are monitored and recorded then as each entity reaches the destination of the event alerts and notices are sent out to all the entities registered for the event letting them know who has arrived. Its Primary use is for scheduling events or meeting locations allowing people who are invited to get alerts when people arrive to the event and to visually see how far away people are that are attending the event and receive details of their estimated time of arrival.

In one embodiment, the frontend is accessed through one or more social media accounts such as Facebook. The frontend may further incorporate additional tools that may be accessed through a social media account. For example, the software may include functionality to tag one or more friends on social media. The software may further include functionality such as the ability to automatically update a user's status indicating their arrival at a location. The frontend may be able to create an event and send invites to the event to one or more other users on a social media platform.

This is also a great tool for parents who are on vacation and want to establish places to meet with their children and for school field trips so that teachers can monitor the activities of the children.

Figure 5:
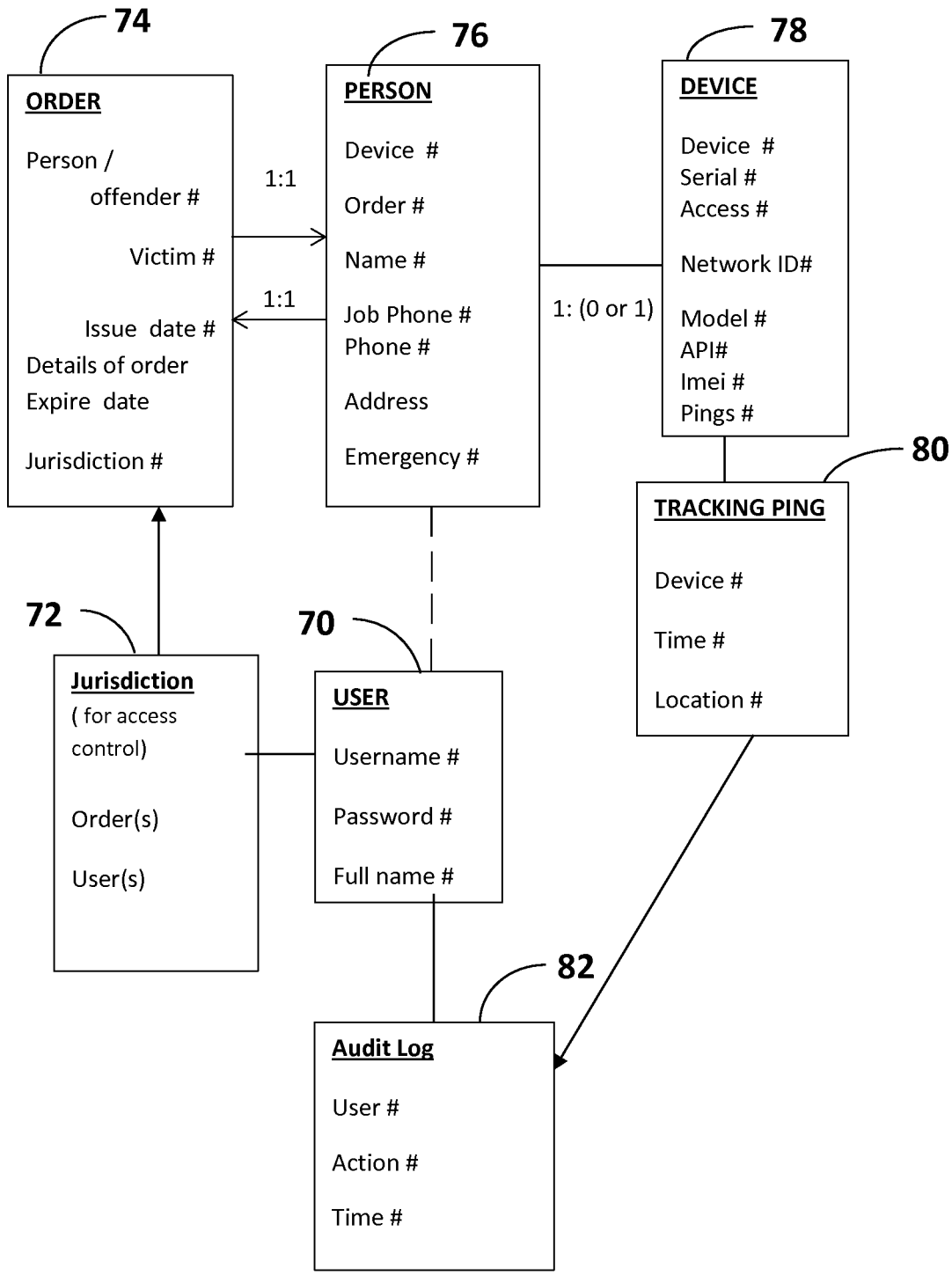
FIG. 5—Data Structure and Tables of the Predictive Policing Process of the Network to enforce protective orders consistent with the certain embodiment of the present invention.

Referring to FIG. 5 is an overall sample data structure for programming the Network 14 (of FIG. 1), in particular to enable the functional embodiment of the invention as a monitoring and tracking network for tracking an offender with respect to relative position of a victim, the relationship and threshold being programmed variables dictated by a court order.

In an embodiment, a user who is typically a member of law enforcement or officer of the court 70 will access a database that contains records describing the court orders currently active in the system 72. The database 72 contains not only currently active orders, but permits a user to create new orders, edit or modify existing orders, or archive orders that have expired. In this embodiment, the user may input details required for the enforcement of the court order 74, such details may include the limitations and restrictions of the court order, the person/s 76 who shall be wearing a tracking device 78 and identifying the offender/Defendant and victim/s/Plaintiff that are involved with the court order, the date the order was issued, the date it will expire and details of the jurisdiction it is assigned in 72. 74 provides the main details of which the predictive policing tool will establish the thresholds of which will be continuously monitored providing what is technically known as a geo-fence. The database 74 references information of each person assigned in the court order 76 with many necessary details including but not limited the following: their full name, aliases, data and place of birth, Driver's licenses, identification number, home address, contact information. Job/s with address and contact phone number, past criminal record to aid and any other court required information necessary to enforce the orders. The database 78 contains the data that associates the tracking devices with who/what is assigned to wear a tracking device in the order 74. 78 contains details including but not limited to the devices IP number, network access number, make, model and serial number of the device, imei (unique number for any cellular device), the pings required to communicate to the network and the person it will be assigned to 76. The person/s 76 might not necessarily be assigned to wear a tracking device however because they are associated with the court order their information is necessary. Tracking Ping database 80 provides information about the device 78 associated with the time zones and time stamps of events and the locations of where it is. The information from database 80 furnishes detailed information in real-time and provides time-stamps of events. 80 is the active portion of the predictive policing tool that provides the clock monitoring system that interfaces with the geo mapping tools in the network establishing a geo-fencing buffer that generates alerts to the legal authorities and those that are assigned to receive alerts for intervention and to the Audit Log 82. The audit log database provides archived detail reports of the events that have occurred that are accessed by the legal authorities and courts only 70.

Figure 6:
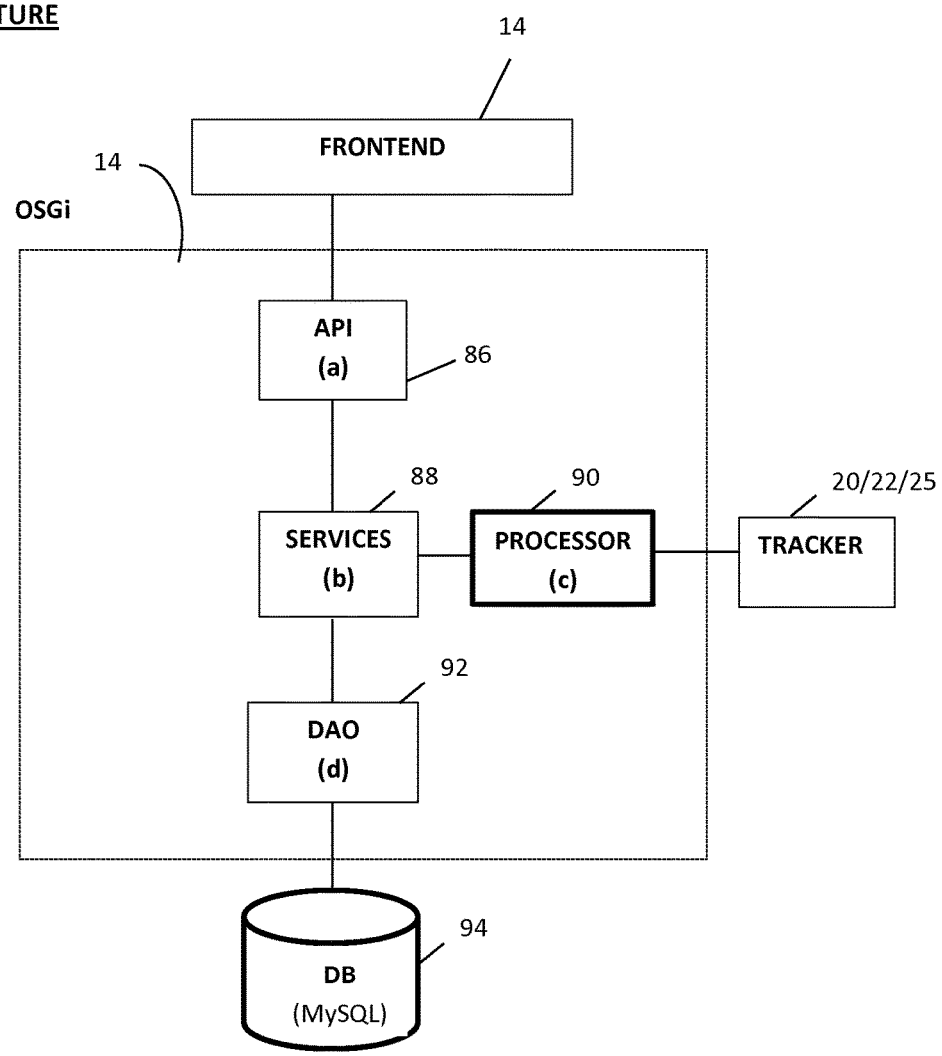
FIG. 6—architecture model for network and a coordinating mobile network consistent with the certain embodiments of the present invention.

The embodiment of FIG. 6 is the Architecture of the present invention monitoring systems network with tracking devices and the mobile virtual private network. The Architecture features the basic tools necessary to operate the monitoring system and the predictive policing tools. The Front End 14 is a computer type system that provides the interface for the users to operate with. The Operating System Graphical Interface (OSGI) 84 is a service mix that is similar to Apache; it incorporates the processing that occurs in the back-end of the system. The Application Programming Interface (API) 86 is necessary to interface the frontend to the OSGI and any other external devices that might be necessary to monitor with. The API 86 provides the interface connection linked directly to the Services 88 which contains the details generated from the databases in FIG. 5 and the details generated from the Processors 90. The Processor 90 provides the components to actively process all the information in real-time that communicates with the tracker/s 20/22/25 which the Processor 90 will provide the details of this information back to the services 88 which will then be analyzed and processed for appropriate actions. The Services 88 processes the information to the DAO 92. The DAO 92 is responsible for handling of the data before it is sent to the databases it is assigned to, DAO 92 is an object that provides an abstract interface to some type of database or other persistence mechanism. By mapping application calls to the persistence layer, DAO provide some specific data operations without exposing details of the database. The Database 94 manages all the details defined in FIG. 5. FIG. 5 Is the Data Structure displaying the tables used to define the data that is necessary to perform predictive policing by collecting the necessary data to provide a means for real-time intervention of crimes and enforcing court orders.

In a non-limiting example, a clerk of court of a particular jurisdiction could input a protective order into the database, and capture all of the information required to identify the offender, the victim and enter this record into the database for later review and processing. The person/s involved in a court order will wear the tracking devices and if any details of the order are violated or the tracking devices lose communication with the network or are tampered with, simultaneously a real-time detailed alert is sent to the authorities so they may intervene and to the victims so they may seek safety. Also simultaneously, a report with time-stamped details is generated to provide evidence to be used in court to enforce the order.

In a non-limiting example, a court order might only monitor one person, such as someone who is on parole.

In a non-limiting example the embodiment of the Data Base can be used for other applications than the court order process demonstrated allowing entities and assets to be tracked, monitored and alerts be sent when thresholds are met.

In a non-limiting example the tracking ping database will provide the activities of the tracking devices with details such as the longitude/latitude with appropriate time stamps.

In a non-limiting example the predictive policing of the network collects associates the data that is entered in from the court order with activities that the tracking devices are involved in. The database will be able to determine the intentions of the movement of the entity wearing the tracking devices based on their behavior patterns and if they make continued movement toward an entity they are to restrain from or if they divert. The Predictive policing tool will automatically send out notices if the thresholds appear to be met and the pings will increase, if it appears the intent is to violate the order then the tool will send out the proper alerts notifying the victim and authorities with the proper details and generate a report.

In a non-limiting example the mobile virtual private network is stand-alone but can be used in conjunction with the network or as a substitute of the network if the communications link is down or independent to provide the ability to privately and actively monitor tracking devices without the need of wireless signals produces by the cellular providers. It can be used as a back-up network for the monitoring system or as its own for remote locations.

I claim:

1. A tracking system for monitoring an entity comprising:
one or more primary tracking apparatuses carried by a first entity, the primary tracking apparatus including one or more sensors;
one or more secondary tracking apparatuses carried by a second entity; the secondary apparatus including one or more sensors;
the tracking system including a monitoring and reporting device, a storage device and operative on a plurality of networks;
the tracking apparatuses having multiple tiered signal transmitting technologies to communicate with any carrier and standalone network through any of a wireless, radio and/or other data communications networks, the tracking apparatuses having a local communications network to communicate with each other;
the tracking apparatuses operative to be tracked simultaneously without communicating to the carrier network;
the monitoring and reporting device used for monitoring in real-time one or more variables collected from the tracking apparatuses through the carrier and/or standalone network, the monitoring and reporting device further used for sending one or more reports regarding the status of the variable to one or more authorities through any carrier and/or standalone network, the monitoring and reporting device further capable of saving the reports to the storage device;
the monitoring and reporting device indicating how close the tracking apparatuses are to one another and at what rate they are traveling to determine when the primary tracking apparatus moves within a programmed threshold of distance with any secondary tracking apparatus;
creating an alert when the measured distance between the locations of the tracking apparatuses decreases below said programmed threshold of distance; and
one or more alert systems installed on at least one of the tracking apparatuses, generating and transmitting real-time reports and real-time alerts to the one or more authorities and transmitting created alerts to each primary tracking apparatus and each secondary tracking apparatus.

2. The tracking system of claim 1 wherein the local communications network transmits information over an associated radio frequency, the associated radio frequency used to communicate between the primary and secondary tracking apparatuses, the associated radio frequency between the primary and secondary tracking apparatuses communicating variable data and pre-established thresholds and the alert system signaling an alert when the predetermined thresholds established between the primary and secondary tracking apparatuses are met.

3. The tracking system of claim 1 wherein the alert systems signal an alert to at least one of the tracking apparatuses.

4. The tracking system of claim 1 wherein the alert systems signal an alert to the tracking system through a wireless communications network.

5. The tracking system of claim 1 wherein the secondary tracking apparatus is placed at a location associated with a second entity.

6. The tracking system of claim 1 wherein the one or more sensors can detect the variables selected from one or more of the following group: moisture types, moisture levels, body temperature, environment temperature, heart rate, audio, water levels, motion detection, blood type of carrier, light levels and vitals.

7. The tracking system of claim 1 wherein the sensor further includes programming containing the entity's medical records and vital records used to pre-establish one or more thresholds, and the alert system sending an alert to the network when the sensor detects that the one or more variables are not within the one or more pre-established thresholds.

8. The tracking system of claim 7 wherein the carrier and/or standalone network transmits a real-time alert to one or more authorities after receiving the alert.

9. The tracking system of claim 7 wherein the carrier and/or standalone network transmits a real-time alert to the one or more tracking apparatuses.

10. The tracking system of claim 1 wherein the signal transmitting technology is selected from the group comprising: cellular, GPS, CDMA, LTE, Wi-Fi, Bluetooth, radio, RFID satellite and new signal transmitting development that consists of high band width and low bandwidth signals, low power consumption, and no power consumption signaling.

11. The tracking system of claim 1 wherein the tracking apparatuses communicate through the local communications network using Bluetooth, radio or RFID and new signal transmitting development that consists of high band width and low bandwidth signals, low power consumption, and no power consumption signaling.

12. The tracking system of claim 1 wherein the alert system emits an electronic shock to the entity carrying one of the tracking apparatuses configured as a secondary tracking apparatus when the entity carrying the secondary tracking apparatus moves to any position within a pre-determined distance from any tracking apparatus configured as a primary tracking apparatus, where the electronic shock is triggered to the secondary tracking apparatus by an authority with remote access transmitting a signal through the network.

13. The tracking system of claim 1 wherein the alert system is triggered when the entity carrying the primary tracking apparatus no longer carries the primary tracking apparatus, or when the primary apparatus loses communication with the monitoring network system.

14. The tracking system of claim 1 wherein the variable includes pre-defined geographical locations and/or is the entities' locations.

15. The tracking system of claim 1 wherein the monitoring and reporting device further includes a geographical mapping tool for real-time location monitoring and reporting of the tracking apparatuses.

16. The tracking system of claim 1 further including a mobile network that monitors one or more variables collected from the primary and secondary tracking apparatuses, the mobile network sending the one or more variables collected to the carrier and/or standalone network.

17. The tracking system of claim 1 wherein the standalone network is a mobile peer-to-peer network capable of privately monitoring the primary and secondary tracking apparatuses.

18. The tracking system of claim 1 wherein the first entity is an asset and the second entity is the owner of the asset.

19. A method for tracking an entity named in a court order comprising the steps of:
    placing a first tracking apparatus on the entity, who is identified as an offender,
    placing a second tracking apparatus on a victim,
    a tracking system device associated with each tracking system apparatus and including a monitoring and reporting device, a storage device and operative on a plurality of networks;
    the tracking apparatuses having multiple tiered signal transmitting technologies to communicate with any carrier and standalone network through any of a wireless, radio and/or other data communications networks, the tracking apparatuses having a local communications network to communicate with each other;
    the tracking apparatuses operative to be tracked simultaneously without communicating to the carrier network;
    monitoring movements and locations of all the tracking apparatuses using said tracking system devices having a connected to any of said plurality of networks,
    measuring a distance between the first and second tracking apparatuses using a local communications network between the first and second tracking apparatuses, the tracking system device indicating how close the tracking apparatuses are to one another and at what rate they are traveling to determine when the first tracking apparatus moves within a programmed threshold of distance with the second tracking apparatus; and
    sending an alert when the measured distance between the locations of the tracking apparatuses decreases below a pre-established distance, and/or when one of the tracking apparatuses indicates that it has been tampered with;
    transmitting a real-time alert to one or more authorities after receiving the alert and simultaneously transmitting a real-time alert to the second tracking apparatus.

20. The method of claim 19 wherein the first tracking apparatus indicates that it has been tampered with by:
    measuring one or more vital signs of the offender using the first tracking apparatus, and
    measuring one or more environmental conditions of the first tracking apparatus;
    comparing the measured vital signs and environmental conditions with one or more pre-defined thresholds;
    sending a signal indicating that one or more of the measured vital signs is outside of the pre-defined thresholds.

* * * * *